United States Patent [19]

Cannalte et al.

[11] 4,188,582
[45] Feb. 12, 1980

[54] SIMULCAST TRANSMISSION SYSTEM HAVING PHASE-LOCKED REMOTE TRANSMITTERS

[75] Inventors: Gary A. Cannalte, Hoffman Estates; Ronald H. Chapman, Wheaton; Walter J. Rozanski, Jr., Schaumburg, all of Ill.

[73] Assignee: Motorola, Inc., Schaumburg, Ill.

[21] Appl. No.: 894,671

[22] Filed: Apr. 10, 1978

[51] Int. Cl.² ............................................. H04B 7/00
[52] U.S. Cl. ..................................... 325/58; 325/17; 325/63; 343/179
[58] Field of Search ..................... 325/58, 63, 53, 54, 325/17; 343/179

[56] References Cited

U.S. PATENT DOCUMENTS

| | | | |
|---|---|---|---|
| 2,067,353 | 1/1937 | Snow | 325/63 |
| 3,862,365 | 1/1975 | Kobayashi et al. | 325/58 |
| 4,117,405 | 9/1978 | Martinez | 325/58 |
| 4,119,912 | 10/1978 | Nagy et al. | 325/58 |

Primary Examiner—Marc E. Bookbinder
Attorney, Agent, or Firm—Rolland R. Hackbart; James W. Gillman

[57] ABSTRACT

A simulcast transmission system is provided where a reference signal transmitted from a central station is utilized to phase-lock transmitters located at remote stations. The remote stations include a receiver for receiving the transmitted reference signal and a signal conditioner for conditioning the received reference signal for application to the transmitters. The transmitters include a phase-locked loop which may be followed by a multiplier for providing transmitter signals of predetermined frequencies. All the transmitters at the remote stations are phase locked to the reference signal transmitted from the central station. In the event that the reference signal transmitted by the central station is interrupted, the signal conditioner of the remote stations will operate in an open-loop fashion to provide the conditioned reference signal during the interruption. After the interruption has cleared, the signal conditioner is automatically phase synchronized to the reference signal and closed-loop operation is resumed.

15 Claims, 7 Drawing Figures

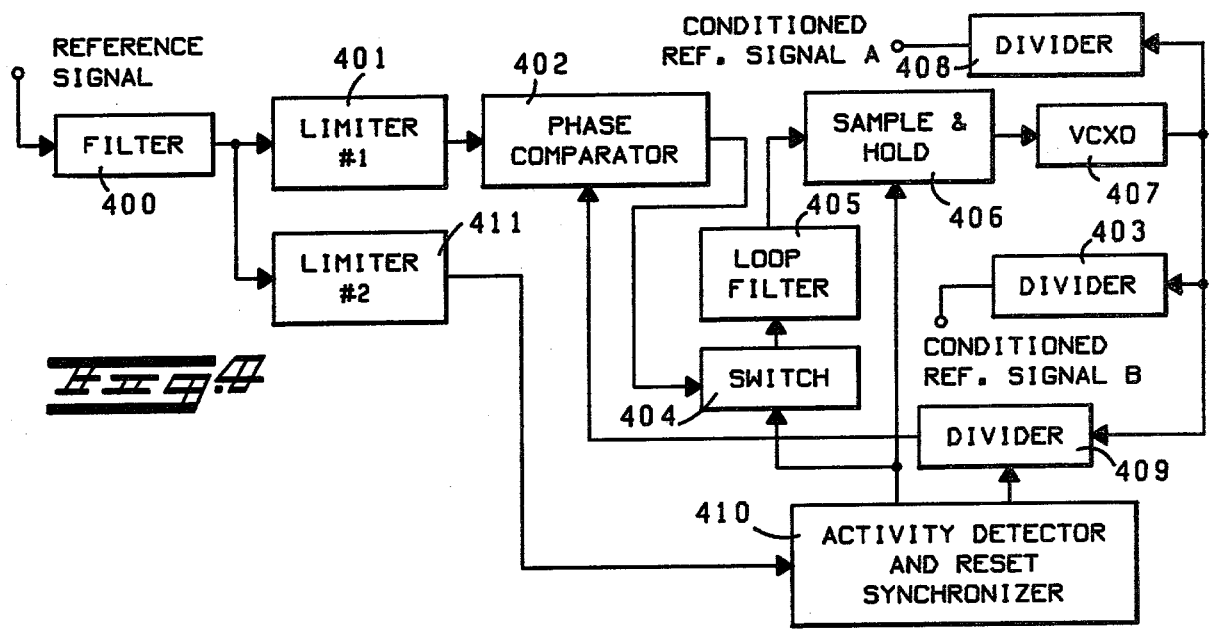
Fig. 4
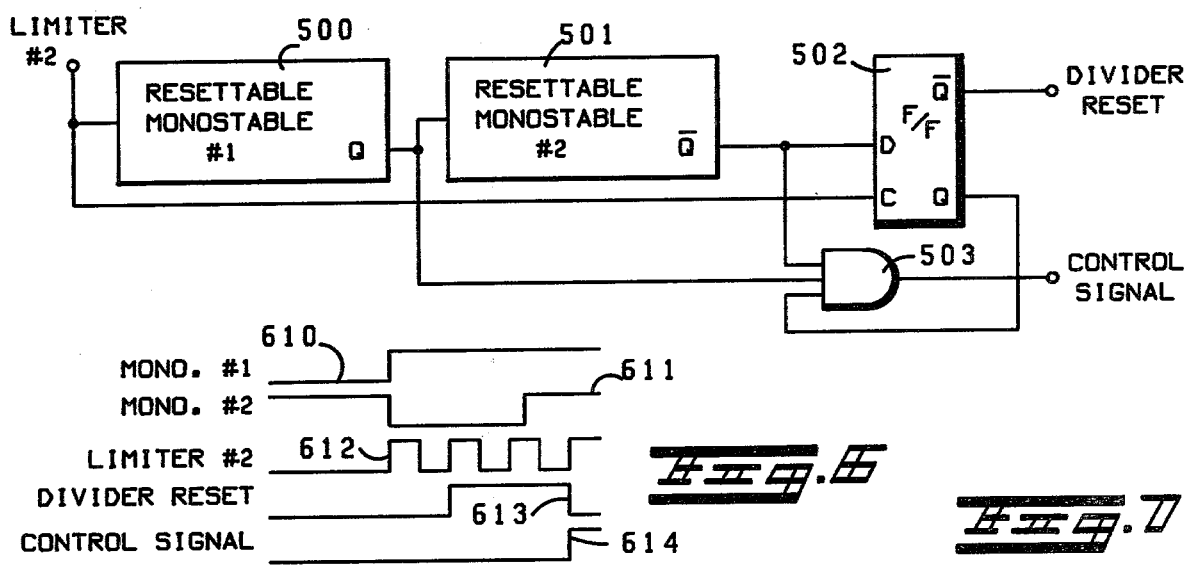
Fig. 5
Fig. 6
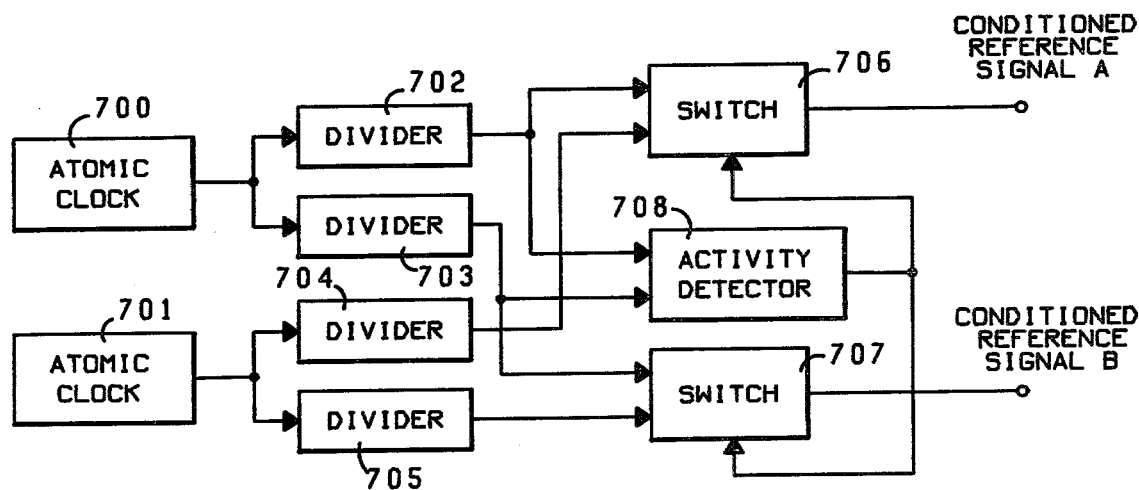
Fig. 7

4,188,582

SIMULCAST TRANSMISSION SYSTEM HAVING PHASE-LOCKED REMOTE TRANSMITTERS

RELATED APPLICATIONS

This application is related to the instant assignees copending patent application Ser. No. 815,885 entitled "Simulcast Transmission System" by James L. Osborn and filed on July 15, 1977.

BACKGROUND OF THE INVENTION

1. Field of the Invention

This invention relates to a phase-locked transmission system and, more particularly, to a simulcast transmission system having a plurality of phase-locked remote transmitters.

2. Description of the Prior Art

Simultaneous broadcast, or simulcast transmission systems, typically have a plurality of remote transmitters that simultaneously broadcast identical audio or information signals at substantially the same carrier frequency. By using a number of geographically diverse transmitters, a simulcast system provides maximum signal coverage to topographically irregular geographical areas, such as mountainous regions, where unobstructed radio coverage is not possible.

The performance of simulcast transmission systems is greatly degraded if the transmitters assigned the same frequency are not operating on substantially the exact same frequency. Frequency offset between transmitters causes audible interference in the form of beat noise. This problem has been typically solved by utilizing very high stability oscillators in each of the transmitters. However, such an approach is expensive and has a number of problems including temperature susceptibility and frequency drift caused by aging of the high stability oscillator necessitating costly periodic maintenance.

The problem of frequency drift is more critical for transmission of data signals than voice signals. Data signals are highly susceptible to beat noise which alters data bits rendering entire data sequences totally incomprehensible. The falsing of data signals may be remedied to some degree by the use of complex error-correction codes requiring complex and expensive coding devices at each station of a simulcast transmission system.

For the foregoing and other shortcomings and problems, there has been a long felt need for an improved simulcast transmission system having transmitters at remote stations with more accurately controlled frequencies.

SUMMARY OF THE INVENTION

Accordingly, it is an object of the present invention to provide an improved simulcast transmission system having phase-locked remote transmitters whose frequencies are accurately maintained relative to a reference signal.

It is a further object of the present invention to provide an improved simulcast transmission system having remote sites each with groups of a plurality of phase-locked transmitters having different frequencies that are accurately maintained relative to a reference signal.

It is yet a further object of the present invention to provide an improved simulcast transmission system having phase-locked remote transmitters whose frequecies are not only accurately maintained relative to a reference signal but also maintained during brief interruptions of the reference signal.

It is yet a further object of the present invention to provide an improved simulcast transmission system having phase-locked remote transmitters whose frequencies are accurately and reliably maintained, immune to aging and relatively immune to environmental variations.

Briefly described, the invention is a simulcast transmission system having a central station for controlling via a communication path the operation of transmitters at a plurality of remote stations. The simulcast transmission system further includes improvement for automatically phase locking the frequencies of the remote transmitter signals. At the central station, a reference oscillator provides a reference signal of a predetermined first frequency that is transmitted via the communication path to the remote stations. Each remote station includes a receiver for receiving via the communication path the transmitted reference signal, a signal conditioner for conditioning the received reference signal and, for each transmitter, a phase-locked loop responsive to the conditioned reference signal for providing an intermediate signal of a predetermined second frequency and a multiplier for multiplying the intermediate signal to provide the transmitter signal of a predetermined third frequency.

Additional features, objects and advantages of the simulcast transmission system in accordance with the present invention will be more clearly apprehended from the following detailed description together with the accompanying drawings.

BRIEF DESCRIPTION OF THE DRAWINGS

FIG. 4 is a block diagram of the signal conditioner shown in FIG. 1.

FIG. 5 is a block diagram of the activity detector and reset synchronizer of FIG. 4.

FIG. 6 is a timing diagram for the activity detector and reset synchronizer of FIG. 5.

FIG. 7 is a block diagram of the signal conditioner of FIG. 2.

DESCRIPTION OF THE PREFERRED EMBODIMENT

Figure 1:
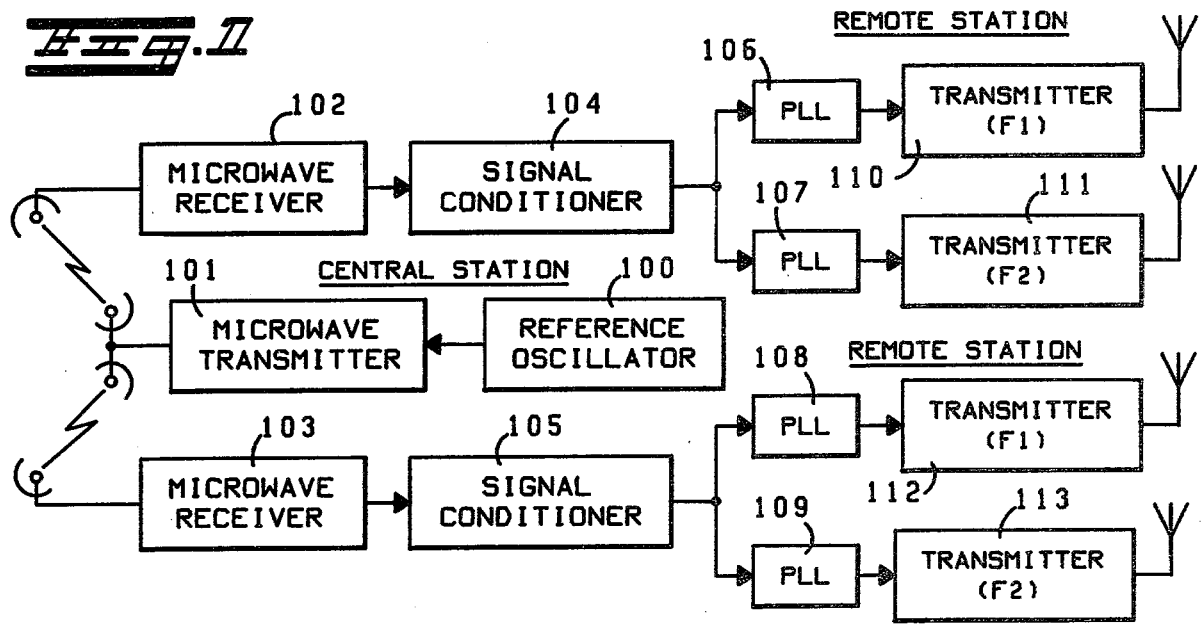
FIG. 1 is a functional block diagram of a simulcast transmission system embodying the present invention.

In FIG. 1, there is illustrated a simulcast transmission system for phase-locking a plurality of transmitters located in remote stations to a reference signal transmitted from a central station. The central station includes a reference oscillator 100 for providing a reference signal of a predetermined frequency and a microwave transmitter 101 for transmitting via a microwave links the reference signal. The remote stations include a microwave receiver 102 and 103 for receiving via the microwave link the reference signal transmitted from the central station, a signal conditioner 104 and 105 for conditioning the received reference signal, a phase-locked loop (PLL) 106 to 110 responsive to the conditioned reference signal for providing an intermedite signal and one or more transmitter blocks 110, 112 and 111, 113 for multiplying the intermediate signal to provide the transmitter signal at frequencies F1 and F2, respectively.

The simulcast transmission system of FIG. 1 may be advantageously applied to the simulcast transmission system described in the aforementioned copending patent application Ser. No. 815,885. The simulcast transmission system of the aforementioned application includes a central station and a plurality of transmitters located at remote stations which are interconnected with the central station by microwave links. Messages to be transmitted simultaneously from the remote stations are multiplexed over the microwave links between the central station and the remote stations. In simulcast transmission systems it is extremely important that messages are transmitted simultaneously and that transmitters assigned to the same channel are maintained at substantially the same exact frequency. Slight frequency offsets between transmitters will cause audible interference in the form of beat noise. According to the present invention, the central station of a simulcast system may be advantageously utilized to transmit a reference signal to the remote stations for phase locking the frequency of the transmitter signals of the remote stations to the reference signal.

Referring back to FIG. 1, the simulcast transmission system illustrated may be advantageously utilized for remote stations operating at UHF frequencies (500 MHz) and remote stations operating at VHF frequencies (150 MHz). For example, a suitable reference signal having a frequency of 100 KHz may be provided by reference oscillator 100. To accommodate UHF radio channels spaced at 25 KHz multiples, the signal conditioner 104 and 105 may provide a conditioned reference signal at 694.4444 Hz. A transmitter signal F1 at 506.0000 MHz is achieved by operating the PLL 106 and 108 at 14.05555 MHz and multiplying by 36 in the transmitter block 110 and 112. A channel F2 spaced 25 KHz higher at 506.0250 MHz may be achieved by programming the PLL 107 and 109 to operate at 14.05625 MHz.

Utilizing the same reference signal of 100 KHz, a conditioned reference signal of 1250.0000 Hz will accommodate VHF radio channels spaced at 15 KHz. In this case, a transmitter signal F1 at 150.0000 MHz is achieved by operating the PLL 106 and 108 at 12.50000 MHz and multiplying by 12 in the transmitter block 110 and 112.

Figure 2:
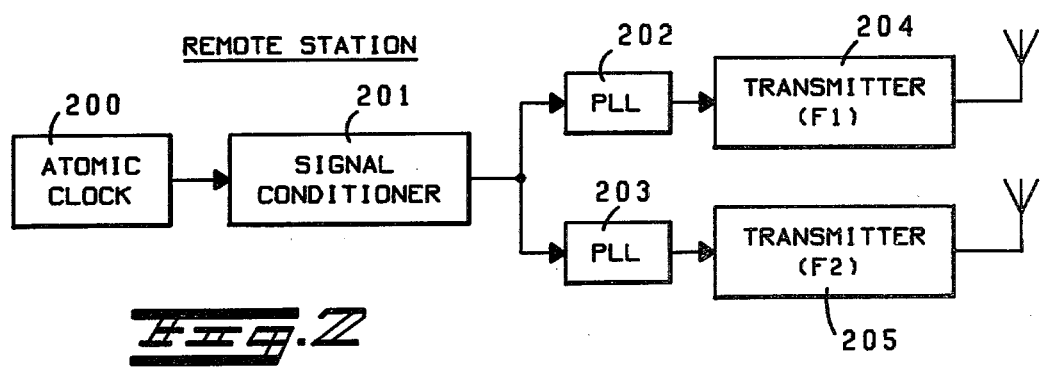
FIG. 2 is a functional block diagram of a remote station of a simulcast transmission system in accordance with the present invention.

In the event that a remote station is not accessible by a communication path, such as a microwave link, the remote station may be organized as shown in FIG. 2. A high stability oscillator, such as an atomic clock 200, is utlized to provide the reference signal. For example, an atomic clock, such as a Hewlett Packard 5062C, may be used to provide a cesium-based reference signal of very high stability. The reference signal is then conditioned by the signal conditioner 201 before application to the phase-locked loops 202 and 203. The intermediate signal from the phase-locked loops 202 and 203 is multiplied by the transmitter block 204 and 205 to provide a transmitter signal at frequencies F1 and F2, respectively.

Figure 3:
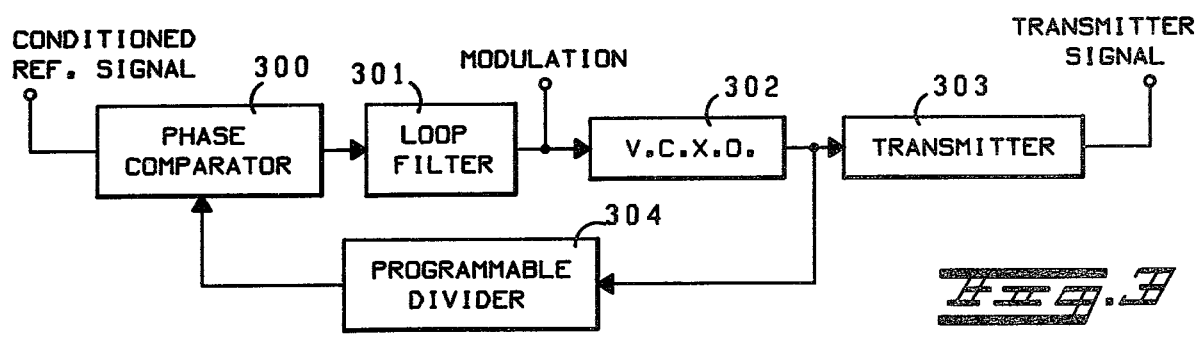
FIG. 3 is a block diagram of the phase-locked loop and transmitter shown in FIG. 1.

The phase-locked loops and transmitters of FIGS. 1 and 2 may be organized as shown in FIG. 3. The phase-locked loop has a forward path, including a phase comparator 300 which may be a phase-frequency comparator, a loop filter 301 and a voltage controlled crystal oscillator (VCXO) 302 coupled in series, and a feedback path including a divider 304 coupled to the VCXO for providing a feedback signal to the phase comparator 300. The VCXO is commonly referred to by those skilled in the art as a channel element. The VCXO is of the type that can be frequency modulated. The modulation may be introduced between the loop filter 301 and the VCXO 302. The VCXO is a high stability oscillator, for example, a VCXO having a stability of two parts per million is typical for a simulcast transmission system.

In the previous example for UHF radio channels spaced at 25 KHz, in order to operate VCXO 302 at 14.05555 MHz for channel F1, the divider 304 is programmed to divide by 20,240. For the next channel F2, the divider 304 is programmed to divide by 20,241 to operate the VCXO at 14.05625 MHz. Thus, the divisor of the divider 304 must be incremented by 1 (from 20,240 to 20,241) to increment by 25 KHz, the channel spacing. The divider 304 is of the programmable type such that a specific divisor can be readily provided, for example, by a predetermined arrangement of pluggable jumper wires.

A block diagram of the signal conditioner 104 and 105 of FIG. 1 is illustrated in FIG. 4. The signal conditioner insures that a conditioned reference signal is always supplied to the phase-locked loops, even during brief and long interruptions of the reference signal from the central station. Referring to FIG. 4, a reference signal from the microwave receiver is filtered by tuned filter 400 before application to the limiters 401 and 411. Limiter 401 is preferably designed to have a higher gain than limiter 411 in order that limiter 411 will cease to operate before limiter 401. This operation of the limiters 401 and 411 is provided so that an interruption in the reference signal can be detected from the output of limiter 411 before the incoming signal path to the VCXO 407 is interrupted.

The output of limiter 401 is applied to a phase-locked loop which has a forward path including phase comparator 402, analog switch 404, loop filter 405, sample and hold circuitry 406 and VCXO 407 coupled in series, and a feedback path including divider 409 coupled to the VCXO 407 for providing a feedback signal to phase comparator 402. The output of the VCXO is applied to dividers 408 and 403 for providing conditioned reference signals A and B, respectively. Two conditioned reference signals are used in a simulcast transmission system having transmitters operating in two different frequency bands, for example, UHF and VHF frequency bands. Each conditioned reference signal is a common denominator of the frequencies of the transmitters to which the conditioned reference signal is coupled.

The output of limiter 411 is applied to activity detector and reset synchronizer 410. The activity detector and reset synchronizer 410 controls the operation of the analog switch 404, the sample and hold circuitry 406 and the divider 409. In response to interruptions of the reference signal, the activity detector and reset synchronizer 410 enables the analog switch 404 to open the forward path to permit the VCXO 407 to free run and enables the sample and hold circuitry 406 to hold. In the hold mode, the sample and hold circuitry 406 may store a voltage proportional to the last received reference signal, which is applied to the VCXO 407 for controlling the frequency of the VCXO 407 during the interruption.

The sample and hold circuitry 406 may be of any suitable type, such as, for example, a reed relay coupled to a low-leakage capacitor or the circuitry described in assignee's copending application Ser. No. 875,251, entitled "Input Activated Frequency Synthesizer" by Donald C. Ryon and filed on Feb. 6, 1978. Once the forward path has been opened, the received reference signal will not again be recognized until it has been detected for at least a pre-established time interval as determined by the activity detector and reset synchronizer 410. Thus, intermittent receptions of the received reference signal will be ignored by the activity detector and reset synchronizer 410.

Upon proper detection of the received reference signal by the activity detector and reset synchronizer 410, the forward path will again be closed. In order to minimize the settling time of the VCXO 407 due to the phase difference between the newly received reference signal and the divider output, the activity detector and reset synchronizer 410 will reset the divider 409 to phase synchronize the output signal of the divider 409 to the received reference signal. Thus, large phase errors caused by interruptions of the reference signal will not result in excessively long settling times in the feedback path of the signal conditioner.

A more detailed block diagram of the activity detector and reset synchronizer 410 of FIG. 4 is illustrated in FIG. 5. The output signal from limiter 411 is applied to resettable monostable device 500, which operates as a missing pulse detector, as is known in the art. The Q output signal from the resettable monostable device 500 is applied to resettable monostable device 501, and AND gate 503. The resettable monostable device 501 is triggered by rising transitions of resettable monostable device 500. The Q output signal from resettable monostable device 501 is applied to flip-flop 502 and AND gate 503. The flip-flop 502 is clocked by rising edges of the output signal from limiter 411 of FIG. 4. The Q output signal from flip-flop 502 is the divider reset signal that is applied to divider 409 of FIG. 4. The Q output signal of flip-flop 502 is aplied to AND gate 503. The output of AND gate 503 is the control signal coupled to analog switch 404 and sample and hold circuitry 406. The devices illustrated in FIG. 5 may be any of a number of commercially available integrated circuits. For example, the resettable monostable devices 500 and 501 may be the Motorola MC14528, and AND gate 503 a Motorola MC14073, the flip-flop 502 a Motorola MC14013 and the analog switch 404 a Motorola MC14016.

Referring to the timing diagram of FIG. 6, the operation of the activity detector and reset synchronizer can be more clearly understood. The output signal 612 of the limiter 411 illustrates the receipt of the reference signal after an interruption. When the first pulse of the reference signal is received, the output signal 612 of limiter 411 causes the output signal 610 of resettable monostable device 500 to transition to a high state. The output signal 610 of resettable monostable device 500 is programmed to remain high for at least one full period of the output signal 612 of limiter 410.

The transition of the output signal 610 of resettable monostable device 500 causes the output signal 611 of the resettable monostable device 501 to change to the low state. At the next transition of the output signal 612 of limiter 411, the output signal 613 of the flip-flop 502 will change to a high state. The high state of the output signal 613 of the flip-flop 502 will cause the divider 409 of FIG. 4 to be reset. If during the time period of the output signal 611 of resettable monostable device 501, the output signal 612 of limiter 411 is interrupted again, then the output signal 613 of the flip-flop 502 will remain high since resettable monostable device 501 will be re-triggered by the interruption. Thus, intermittent receipt of the reference signal after a relatively long interruption and occurring during the time period of resettable monostable device 501 will be ignored. The time period of resettable monostable device 501 may be chosen to be any suitable time period greater than twice the period of the reference signal.

The control signal 614 from the AND gate 503 will enable the analog switch 404 to close the forward path to the VCXO 407 and enable the sample and hold circuitry 406 to sample when the output signal 611 of the resettable monostable device 501 times out and the output signal 613 of the flip-flop 502 changes to a low state. When the control signal 614 switches to the high state, closed-loop operation of the VCXO 407 is provided.

A block diagram of the atomic clock 200 and signal conditioner 201 of FIG. 2 is illustrated in FIG. 7. Redundant atomic clocks 700 and 701 are provided to enhance reliability. In the event that the atomic clock 700 fails, automatic switching is provided to the other. Referring to FIG. 6, the atomic clocks 700 and 701 are coupled to dividers 702, 703 and 704, 705, respectively. The dividers 702 and 704 are programmed to divide by the same number, likewise dividers 703 and 705 are programmed to divide by the same number. Dividers 702 and 703 are designated the master dividers and are applied to activity detector 708. Switches 706 and 707 are provided for selecting between dividers 702 and 704 and dividers 703 and 705, respectively. In response to an interruption in the output signal from either or both of the master dividers 702 and 703, the activity detector 708 provides an output signal to cause the switches 706 and 707 to switch to dividers 704 and 705, respectively.

In order to provide the aforementioned reference signals for UHF and VHF radio channels, the atomic clocks 700 and 701 may be selected to provide a 100 KHz reference signal. Dividers 702 and 704 may be programmed to provide a divisor of 144 for a 694.4444 Hz conditoned reference signal A. Dividers 703 and 704 may be programmed to provide a divisor of 80 for a 1250.00 Hz conditioned reference signal B.

The foregoing embodiments have been intended as illustrations of the principles of the present invention. Accordingly, other modifications, uses and embodiments can be devised by those skilled in the art without departing from the spirit and scope of the principles of the present invention.

What is claimed is:

1. In a simulcast transmission system having a central station for controlling via communication paths the operation of transmitters at a plurality of remote stations, said simulcast transmission system including improvement for automatically phase locking the frequency of the transmitter signals of the remote stations, comprising:
    (a) said central station including:
        (1) an oscillator for providing a reference signal of a predetermined first frequency; and
        (2) a transmitter for transmitting via the communication paths the reference signal; and
    (b) each of said remote stations including:
        (1) a receiver for receiving via the communication path the transmitted reference signal;
        (2) a signal conditioner for providing a conditioned reference signal from the received reference signal, said signal conditioner including:

(i) a first phase-locked loop including a forward path having a phase comparator, an analog switch, a loop filter, sample and hold circuitry and a voltage-controlled crystal oscillator (VCXO) coupled in series, and a feedback path having a first divider coupled to the VCXO for providing a feedback signal to the phase comparator;

(ii) a second divider coupled to the VCXO for providing the conditioned reference signal of a predetermined second frequency;

(iii) a detector for detecting the presence of the received reference signal and providing an activity indication signal when the received reference signal is present; and (iv) control means for opening the analog switch, enabling the sample and hold circuitry to maintain the frequency of the VCXO and providing a reset signal to reset the first divider to a predetermined state in the absence of the activity indication signal, the control means closing the analog switch, enabling the sample and hold circuitry to sample the output of the loop filter for controlling the frequency of the VCXO, and removing the reset signal from the first divider in response to the presence of the activity indication signal;

(3) a second phase-locked loop responsive to the conditioned reference signal for providing an intermediate signal of a predetermined third frequency; and (4) a multiplier for multiplying the intermediate signal to provide a transmitter signal of a predetermined fourth frequency.

2. The simulcast transmission system according to claim 1, wherein said control means is responsive to the activity indication signal for removing the reset signal from the first divider when the received reference signal is phase-aligned with the predetermined state of the first divider.

3. The simulcast transmission system according to claim 1 or 2 further including delay means interposed between the activity detector and the control means for delaying the response of the control means to the activity indication signal by a predetermined time interval.

4. The simulcast transmission system according to claims 2 or 1 wherein each of said remote stations includes a plurality of second phase-locked loops and corresponding multipliers for providing transmitter signals at corresponding predetermined frequencies.

5. The simulcast transmission system according to claim 1, wherein said oscillator is an atomic oscillator.

6. The simulcast transmission system according to claim 1, further including at least one appended remote station having an atomic oscillator for providing a first output signal of the predetermined first frequency, a divider for dividing the first output signal to provide a conditioned output signal, a phase-locked loop responsive to the conditioned output signal for providing a second output signal of the predetermined second frequency and a multiplier for multiplying the second output signal to provide a transmitter signal of the predetermined third frequency.

7. In a simulcast transmission system having a central station for controlling via microwave communication paths the operation of transmitters of a plurality of remote stations, said simulcast transmission system including improvement for automatically phase locking the frequency of the transmitter signals of the remote stations, comprising:

(a) said central station including:
 (1) an oscillator for providing a reference signal of a predetermined first frequency; and
 (2) a transmitter for transmitting via the microwave communication paths the reference signal; and (b) each of said remote stations including:
 (1) a receiver for receiving via the microwave communication path the transmitted reference signal;
 (2) a signal conditioner including:
  (i) a first phase-locked loop including a forward path having a phase comparator, loop filter, an analog switch, sample and hold circuitry and a voltage-controlled crystal oscillator (VCXO) and a feedback path having a first divider coupled to the VCXO for providing a feedback signal to the phase comparator,
  (ii) a second divider coupled to the VCXO for providing a first conditioned reference signal of a predetermined second frequency;
  (iii) a first monostable device for detecting the received reference signal to provide an activity indication signal;
  (iv) a flip-flop responsive to the activity indication signal and the received reference signal for providing a reset signal for resetting the first divider to phase synchronize the output signal of the first divider to the received reference signal; and the analog switch closing the forward path to the VCXO and the sample and hold circuitry being enabled to sample in response to the activity indication signal;

(c) a second phase-locked loop responsive to the first conditioned reference signal for providing a first intermediate signal of a predetermined third frequency; and (d) a first multiplier for multiplying the first intermediate signal to provide a transmitter signal of a predetermined fourth frequency.

8. The simulcast transmission system according to claim 7, wherein said signal conditioner includes a third divider for providing a second conditioned reference signal of a predetermined fifth frequency, each of said remote stations including a third phase-locked loop responsive to the first conditioned reference signal for providing a second intermediate signal of a predetermined sixth frequency and a second multiplier for multiplying the second intermediate signal to provide a transmitter signal of a predetermined seventh frequency.

9. The simulcast transmission system according to claim 8, wherein said signal conditioner further includes gating circuitry and a second monostable device, the second monostable device being interposed between the first monostable device and the flip-flop, said second monostable device being responsive to the activity indication signal of the first monostable device for providing a pulse signal of a predetermined time period, the flip-flop being responsive to the pulse signal for providing the reset signal for resetting the first divider to phase synchronize the output signal of the first divider to the received reference signal, the gating circuitry being responsive to the activity indication signal, the absence of the pulse signal and the absence of the reset signal for enabling the analog switch to close the forward path to the VCXO and the sample and hold circuitry to sample.

10. In a transmission system for distributing a reference signal from a central station to a plurality of remote stations via communication paths therebetween, each remote station including a signal conditioner for providing a conditioned reference signal from the reference signal received thereat, said signal conditioner comprising:
 (a) phase-locked loop means coupled to the received reference signal, said phase-locked loop means including a forward path having phase comparator means, analog switch means, loop filter means, sample and hold means and voltage-controlled crystal oscillator (VCXO) means coupled in series, and a feedback path having a first dividing means coupled to the VCXO means for providing a feedback signal to the phase comparator means;
 (b) second dividing means coupled to the VCXO means for providing the conditioned reference signal;
 (c) means coupled to the received reference signal for detecting the presence of the received reference signal and providing an activity indication signal when the received reference signal is present; and
 (d) control means for opening the analog switch means, enabling the sample and hold means to maintain the frequency of the VCXO means and providing a reset signal to reset the first dividing means to a predetermined state in the absence of the activity indication signal, the control means thereafter closing the analog switch means, enabling the sample and hold means to sample the output of the loop filter means for controlling the frequency of the VCXO means, and removing the reset signal from the first dividing means in response to the presence of the activity indication signal.

11. The signal conditioner according to claim 10, wherein said control means is responsive to the activity indication signal for removing the reset signal from the first dividing means when the received reference signal is phase-aligned with the predetermined state of the first divider.

12. The signal conditioner according to claim 10 or 11 further including delay means interposed between the activity detecting means and the control means for delying the response of the control means to the activity indication signal by a predetermined time interval.

13. In a simulcast transmission system having a central station for controlling via communication paths the operation of transmitters at a plurality of remote stations, said simulcast transmission system including improvement for automatically phase locking the frequency of the transmitter signals of the remote stations, comprising:

(a) said central station including:
  (1) an oscillator for providing a reference signal of a predetermined frequency; and
  (2) a transmitter for transmitting via the communication paths the reference signal; and
 (b) each of said remote stations including:
  (1) a receiver for receiving via the communication path the transmitted reference signal;
  (2) a signal conditioner for providing a conditioned reference signal from the received reference signal, said signal conditioner including:
   (i) a first phase-locked loop including a forward path having a phase comparator, an analog switch, a loop filter, sample and hold circuitry and a voltage-controlled crystal oscillator (VCXO) coupled in series, and a feedback path having a first divider coupled to the VCXO for providing a feedback signal to the phase comparator;
   (ii) a second divider coupled to the VCXO for providing the conditioned reference signal of a predetermined frequency;
   (iii) a detector for detecting the presence of the received reference signal and providing an activity indication signal when the received reference signal is present; and
   (iv) control means for opening the analog switch, enabling the sample and hold circuitry to maintain the frequency of the VCXO and providing a reset signal to reset the first divider to a predetermined state in the absence of the activity indication signal, the control means closing the analog switch, enabling the sample and hold circuitry to sample the output of the loop filter for controlling the frequency of the VCXO, and removing the reset signal from the first divider in response to the presence of the activity indication signal; and
  (3) a second phase-locked loop responsive to the conditioned reference signal for providing an output signal of a predetermined frequency to the transmitter.

14. The simulcast transmission system according to claim 13, wherein said control means is responsive to the activity indication signal for removing the reset signal from the first divider when the received reference signal is phase-aligned with the predetermined state of the first divider.

15. The simulcast transmission system according to claim 13 or 14 further including delay means interposed between the activity detector and the control means for delaying the response of the control means to the activity indication signal by a predetermined time interval.

* * * * *